(12) United States Patent
Kohler (10) Patent No.: US 7,581,629 B2
(45) Date of Patent: Sep. 1, 2009

(54) CONSTRUCTION DEBRIS CHUTE

(76) Inventor: Craig Kohler, 4722 Carolyn La., White Bear Lake, MN (US) 55110

( * ) Notice: Subject to any disclaimer, the term of this patent is extended or adjusted under 35 U.S.C. 154(b) by 64 days.

(21) Appl. No.: 12/075,171

(22) Filed: Mar. 10, 2008

(65) Prior Publication Data
US 2008/0230346 A1 Sep. 25, 2008

Related U.S. Application Data

(60) Provisional application No. 60/918,753, filed on Mar. 19, 2007.

(51) Int. Cl.
*B65G 11/10* (2006.01)
(52) U.S. Cl. .................... 193/25 A; 193/2 R; 193/25 E; 193/2 A
(58) Field of Classification Search ............... 193/2 R, 193/25 R, 25 A, 25 E, 25 FT, 33, 34, 2 A
See application file for complete search history.

(56) References Cited

U.S. PATENT DOCUMENTS

| | | | | |
|---|---|---|---|---|
| 4,264,213 A | * | 4/1981 | Dillman | 193/32 |
| 4,640,403 A | * | 2/1987 | McDermott | 193/34 |
| 4,712,664 A | * | 12/1987 | Angus | 193/17 |
| 5,253,766 A | * | 10/1993 | Sims | 193/2 A |
| 5,551,576 A | * | 9/1996 | Importico | 193/2 R |
| 5,806,759 A | * | 9/1998 | Axisa | 193/34 |
| 6,371,272 B1 | * | 4/2002 | Walther et al. | 193/4 |
| 7,089,642 B2 | * | 8/2006 | Grata | 193/30 |

\* cited by examiner

*Primary Examiner*—James R Bidwell
(74) *Attorney, Agent, or Firm*—Jacobson and Johnson; Thomas N. Phung (57) ABSTRACT

A construction debris chute system comprising a construction debris chute formed by a plurality of common panels with the plurality of common panels each comprising a first panel, a second panel and a bottom panel that are linked to each other by a set of hinges a construction debris receiver box comprising a frame box and a chute-receiving portion extending at an angle from the frame box; and a bottom discharge unit comprising a discharge platform frame fitted to extend over a portion of a dumpster and a chute-supporting base extending upwards at an angle from the discharge platform frame for receiving a second end of the construction debris chute therein.

20 Claims, 7 Drawing Sheets

CONSTRUCTION DEBRIS CHUTE

CROSS REFERENCE TO RELATED APPLICATIONS

This application claims priority to U.S. Provisional Application Ser. No. 60/918,753; filed on Mar. 19, 2007; titled CONSTRUCTION DEBRIS CHUTE SYSTEM.

FIELD OF THE INVENTION

This invention relates generally to construction debris chutes and more specifically to a construction debris chute system that can be quickly assembled and disassembled to allow the users to transport construction materials to and from elevated locations.

STATEMENT REGARDING FEDERALLY SPONSORED RESEARCH OR DEVELOPMENT

None

REFERENCE TO A MICROFICHE APPENDIX

None

BACKGROUND OF THE INVENTION

In the construction or remodeling of taller buildings, construction debris or wastes typically builds up on the floor where the work is being done. On the higher floors, the removal of the construction waste can often be a troublesome and time-consuming endeavor. The concept of debris chutes that can be erected at construction sites such as office buildings or high rises for use in the removal of construction waste is known in the art. The debris chutes of the prior art offer an easy method of disposing the construction waste from elevated floors of office and high-rise buildings.

Debris chutes typically comprises a cylindrical shaped tube made of a flexible plastic material that is erected adjacent an exterior wall of a building and extend vertically upward to an opening, such as a window of the building. The debris chute includes a first opening located proximal the building window to allow for the user to dispose the construction waste therein and a second opening positioned directly above a disposal bin located at ground level for egress of the construction wastes conveyed by the debris chute into the disposal bin.

Although the prior art debris chutes work for their intended purpose, one of the common problems associated with the prior art debris chutes is the velocity at which the construction wastes are conveyed down the debris chute. More specifically, since debris chutes typically are secured adjacent the exterior wall of the buildings and extend vertically upwards along the exterior wall of the building, construction wastes that are dispose in the first opening of the debris chute can reach the disposal bin at dangerous velocities since the aforementioned debris chutes offer little to no resistance for reducing the velocity of the construction wastes as the construction wastes travel down the debris chute. In addition, since debris chutes are typically positioned perpendicular to the disposal bin, construction wastes that exit the debris chutes tend to fill only a localized area of the disposal bin thereby requiring the disposal bin to be moved numerous times in order to completely fill up the disposal bin. The aforementioned may also lead to a higher tendency of the chute to clog near the end of the chute, which may lead to safety issue while de-clogging the chute.

SUMMARY OF THE INVENTION

Briefly, the present invention comprises a construction debris chute system formed by three main parts, namely a construction debris chute, a construction debris receiver box, and a bottom discharge unit. The construction debris chute is formed by a plurality of common panels with the plurality of common panels each comprising a first panel, a second panel and a bottom panel that are linked to each other by a set of hinges. The construction debris receiver box comprises a frame box and a chute-receiving portion extending at an angle from the frame box for receiving a first end of the construction debris chute. The bottom discharge unit comprising a discharge platform frame fitted to extend over a portion of a dumpster and a chute-supporting base extending upwards at an angle from the discharge platform frame for receiving a second end of the construction debris chute therein. The discharge platform frame includes a platform supported by a set of column with the platform having a construction debris outlet thereon for directing construction debris moving through the construction debris chute into the dumpster.

DESCRIPTION OF THE PRIOR ART

U.S. Pat. No. 3,627,090 teaches a sectional, dismountable, refuse chute for use on a building at a construction site or the like.

U.S. Pat. No. Des. 328,174 shows a design of a waste disposal chute.

U.S. Pat. No. 5,472,768 teaches a kit for the construction of a debris conveyor chute made up of a plurality of tubular sections.

DESCRIPTION OF THE PREFERRED EMBODIMENT

Figure 1:
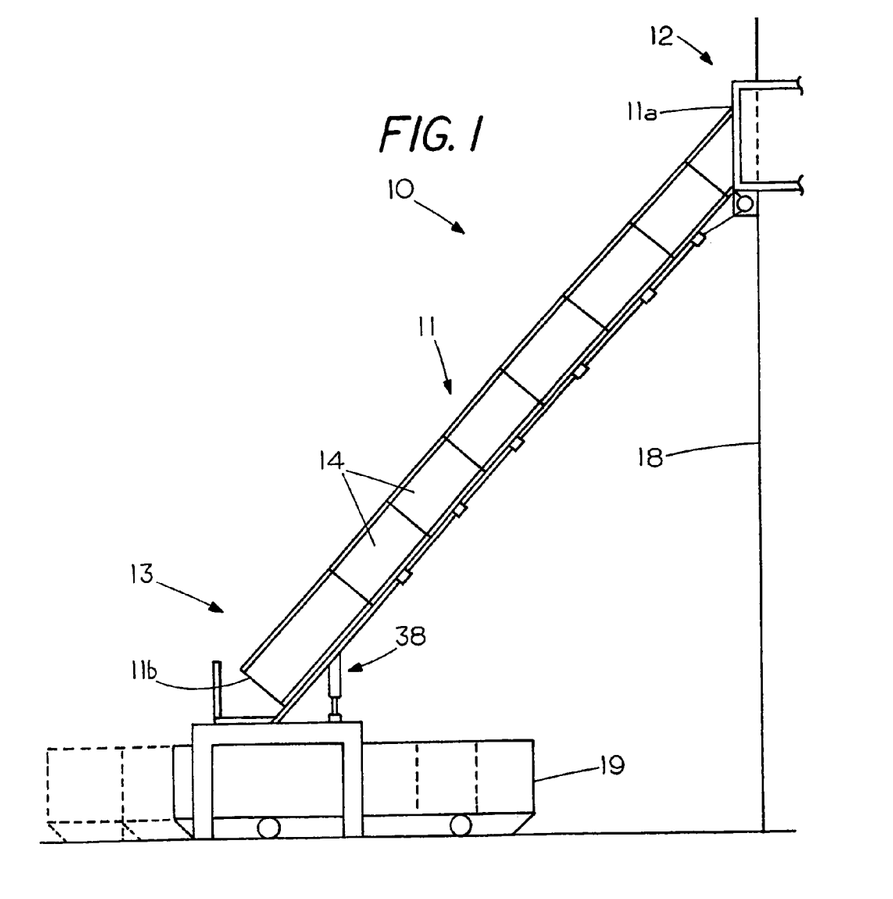
FIG. 1 shows a side view of a construction debris chute system.

FIG. 1 shows a side view of a construction debris chute system 10 of the present invention, which comprises three main parts, namely a construction debris chute 11 formed by a plurality of common panels 14, a window receiver box 12 shown engaging a portion of a building 18, and a bottom discharge unit 13, which is shown supported over a portion of a dumpster 19. Although the construction debris chute system 10 of the present invention can be made from a plurality of materials including wood and metal, the construction debris chute system preferably is formed from a weather and temperature resistant high-density polymer plastic such as a polyethylene plastic.

Figure 2:
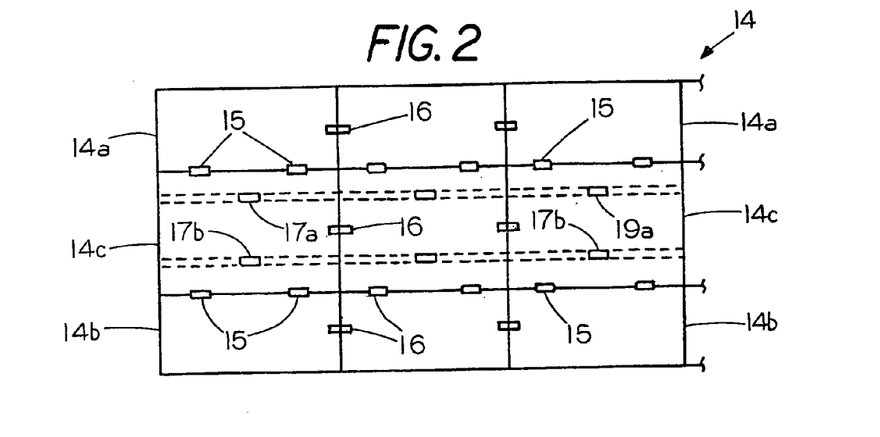
FIG. 2 shows three sets of common panels of the construction debris chute laid out in a flat condition.
Figure 3:
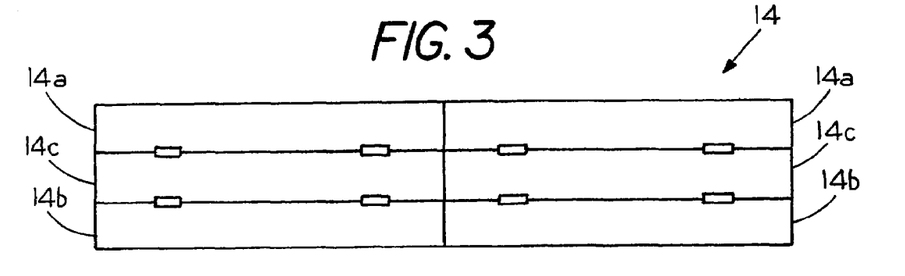
FIG. 3 shows two sets of common panels of the construction debris chute in a folded condition for storage.
Figure 4:
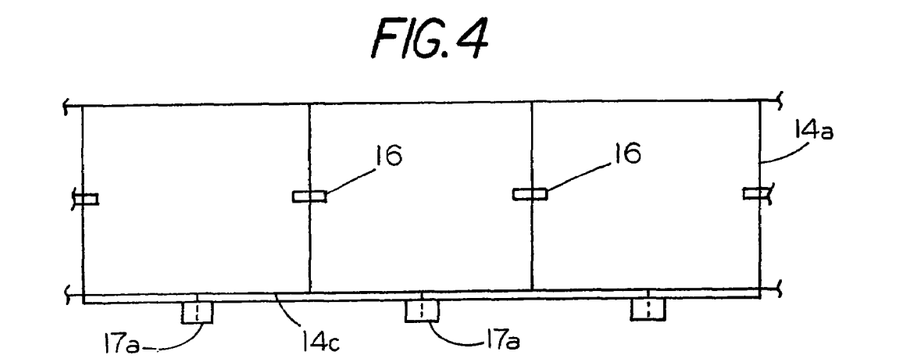
FIG. 4 shows a side view of the common panels of FIG. 2 in an assembled condition.
Figure 5:
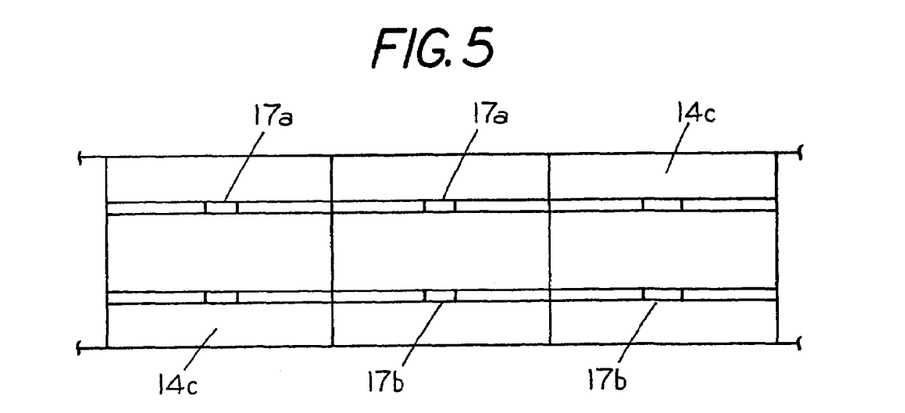
FIG. 5 shows a bottom view of the common panels of FIG. 2 in an assembled condition.

Referring to FIGS. 2, 3, 4, and 5, FIG. 2 shows three sets of common panels 14, which forms the construction debris chute 11 laid out in a flat condition. FIG. 3 shows two sets of common panels 14 of the construction debris chute 11 in a folded condition for storage. FIG. 4 shows a side view and FIG. 5 shows a bottom view of the common panels 14 of FIG. 2 in an assembled condition. Generally, the sets of common panels 14 each comprise a first panel 14a, a second panel 14b and a bottom panel 14c. Panels 14a, 14b, and 14c are attached to each other by a set of hinges 15.

As shown in FIG. 2, the sets of common panels 14 of the construction debris chute 11 are secured to each other through the use of a plurality of bolts 16, which functions not only to provide rigidity to the construction debris chute 11 but also to reduce or eliminate movement of the common panels 14 during use. A feature of the present invention is that since the construction debris chute 11 comprises a plurality of common panels 14, the construction debris chute 11 can be customized to handle various task requirements, including tasks of varying heights. Some of the advantages of the panels of the resent invention are that since the panels are of uniform size, the panels are easily replaceable if damages and the cost of manufacturing the panels are reduced.

Referring to FIG. 2, another feature of the present invention is that each of the bottom panel 14c of common panels 14 includes a first cable guide bracket 17a and a second cable guide bracket 17b each for supporting a guide cable therein. When assembled the first cable guide bracket 17a of each of the bottom panel 14c form a linear path that runs parallel to a linear path formed by the second cable guide bracket 17b of each of the bottom panel 14c. The presence of the guide cables supported by the cable guide brackets 17a, 17b not only provides for an automated system to erect the construction debris chute 11 but also adds strength and structurability to the construction debris chute 11 while reducing or eliminating the need for use of scaffolding.

In the installation process the guide cables 23 are tighten through the use of a winch (shown in FIGS. 8 and 9) to provide suspension, rigidity, and support to the construction debris chute 11 to reduce sagging. Although the capacity of the guide cable used for the present invention may vary depending on numerous factor including but not limited the length of the construction debris chute 11, the type of materials that the common panels 14 are made from, and the type of construction materials being disposed, guide cables having a weight capacity of at least 7000 lbs were used in the present embodiment.

Referring back to FIG. 1, a feature of the present invention is that the construction debris chute 11 is positioned during use at an angle with respect to the window receiver box 12 and the bottom discharge unit 13 such that the bottom panels 14c of the common panels 14 form an angle of deflection to decrease the velocity of the construction debris as the construction debris slides down the construction debris chute 11. It is preferred that the angle of deflection is less than 90 degrees. Decreasing the velocity of the construction debris as the construction debris travels down the construction debris chute 11 reduces the potential for injuries resulting from moving construction debris. Providing for an angling construction debris chute 11 also allows construction debris to fill a greater volume in the dumpster before the dumpster is required to be moved. An advantage to construction debris chute 11 being positioned during use at an angle with respect to the window receiver box 12 and the bottom discharge unit 13 is that it allows construction debris chute 11 to be erected over pathways such as sidewalks or over flower beds or other types of landscaping to maintain minimal damage to the original aesthetics of the work site.

Figure 6:
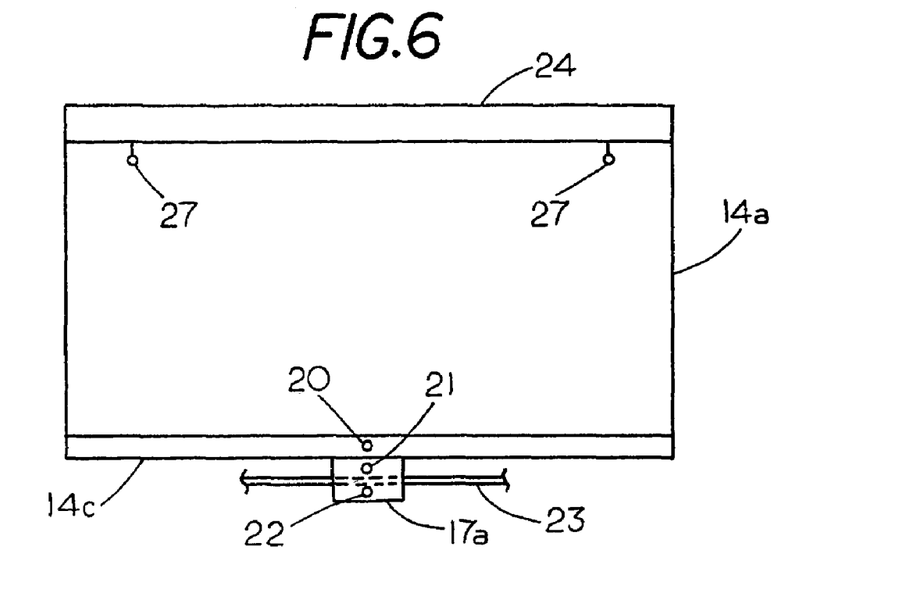
FIG. 6 shows a close-up side view of one set of common panels in an assembled condition.
Figure 7:
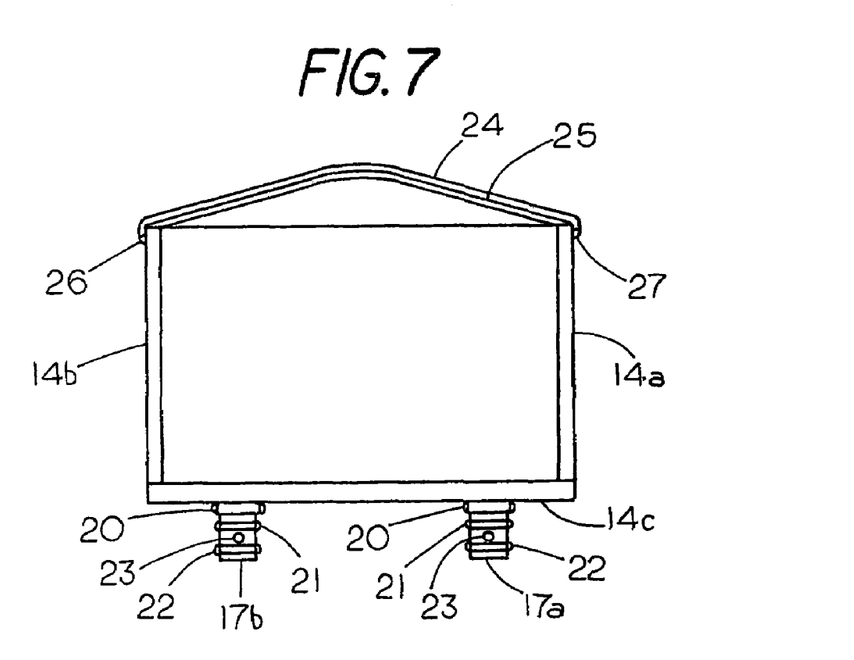
FIG. 7 shows a front of view of one set of common panels in an assembled condition.

Referring to FIGS. 6 and 7, FIG. 6 shows a close-up side view and FIG. 7 shows a front of view of one set of common panels 14 in an assembled condition. As shown in FIGS. 6 and 7, the plurality of cable guide brackets 17a and 17b are each fixed to the bottom panel 14c. Although the cable guide brackets 17a and 17b may be fixed to the bottom panel 14c by a variety of means such as through the use of an adhesive, welded to bottom panel 14c, or integrally formed with the bottom panel 14c, FIGS. 6 and 7 show cable guide brackets 17a and 17b each fixed to bottom panel 14c by a bracket bolt 20.

Each of the plurality of cable guide brackets 17a and 17b included a first rotating bolt 21 and a second rotating bolt 22 which cooperate to support a guide cable therebetween. It is noted that although not required, the rotating feature of bolts 21 and 22 help to alleviate stress on the guide cable 23 resulting from frictional forces cause by the engagement of the bolts 21 and 22 to guide cable 23 while also increasing the ease of assembly and disassembly of construction debris chute 11 by allowing guide cable 23 to freely move between the rotating bolts.

Although not required first rotating bolt 21 preferably is non-removable from cable guide brackets 17a and 17b whereas second rotating bolt 22 can easily attach and detach from cable guide brackets 17a and 17b to allow for swift mounting of guide cable 23 to cable guide brackets 17a and 17b during assembly of construction debris chute 11.

That is, during assembly of construction debris chute 11 guide cable 23 are first pulled up and secured to the window receiver box 12. The guide cables 23 are then tighten through the use of a winch or come-a-longs to provide suspension, rigidity, and support to the construction debris chute 11 to reduce sagging. The assembler then engages a portion of guide cable 23 to the first rotating bolt 21 of cable guide bracket 17a or 17b of a first set of panels and then locks guide cable 23 to the cable guide bracket 17a or 17b of panels by attaching second rotating bolt 22 to the cable guide bracket 17a or 17b. The assembler then signals to a winch controller to actuate the winch, which has a winch cable attached to a speader bar 29 (shown in FIG. 8) that is attached to the first set of panels, to pull up the first set of panels to a required distance so that a second set of panels are in condition for securement to guide cable 23. The assembler then engages a portion of guide cable 23 to the first rotating bolt 21 of cable guide bracket 17a or 17b of the second set of panels and then locks guide cable 23 to the cable guide bracket 17a or 17b of the second set of panels by attaching second rotating bolt 22 to the cable guide bracket 17a or 17b. The aforementioned steps are repeated until the first set of panels reach the window receiver box 12 at which they are secured thereto to form construction debris chute 11. Vice versa, in the disassembly of construction debris chute 11 the user first detaches the second rotating bolt 22 from cable guide bracket 17a or 17b and displaces the guide cable 23 from the cable guide bracket 17a or 17b.

An advantage of the present invention is that once the winch 35 has been used to erect the construction debris chute 11, the winch may then be used in conjunction with the construction debris chute 11 to pull materials upwards to the construction area.

In FIGS. 6 and 7, the assembled set of common panels 14 is shown as further including a top cover 24 supported by an arch bar 25 connecting the first panel 14a to the second panel 14b. Top cover 24 is secured to the assembled set of common panels 14 by a set of fasteners 26 and 27 located on panels 14a and 14b. It is noted that the top cover 24 can be made from a plurality of materials including but not limited to various types of fabrics, puncture and weather-resistant plastics, and nylon such as in the form of various types of tarp. Fasteners 26 and 27 can comprise a variety of securing devices including but not limited to hooks, bungee cords, nut and bolts, and latches.

Figure 8:
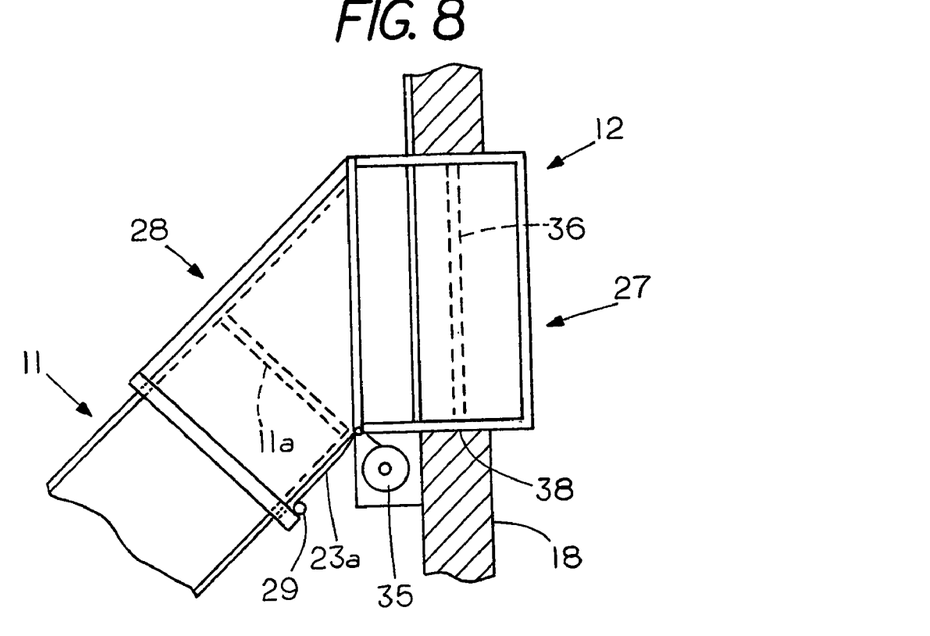
FIG. 8 is close-up partial cross-sectional view of the window receiver box of the construction debris chute system of FIG. 1.

FIG. 8 is close-up partial cross-sectional view of the window receiver box 12 of the construction debris chute system 10 of FIG. 1. The window receiver box 12 comprises two main parts, namely a frame box 27 and a chute-receiving portion 28 extending at an angle from the frame box 27. FIG. 8 also shows the winch cable 23a hooked up to a spreader bar 29, which is linked to the first set of panels.

Figure 9:
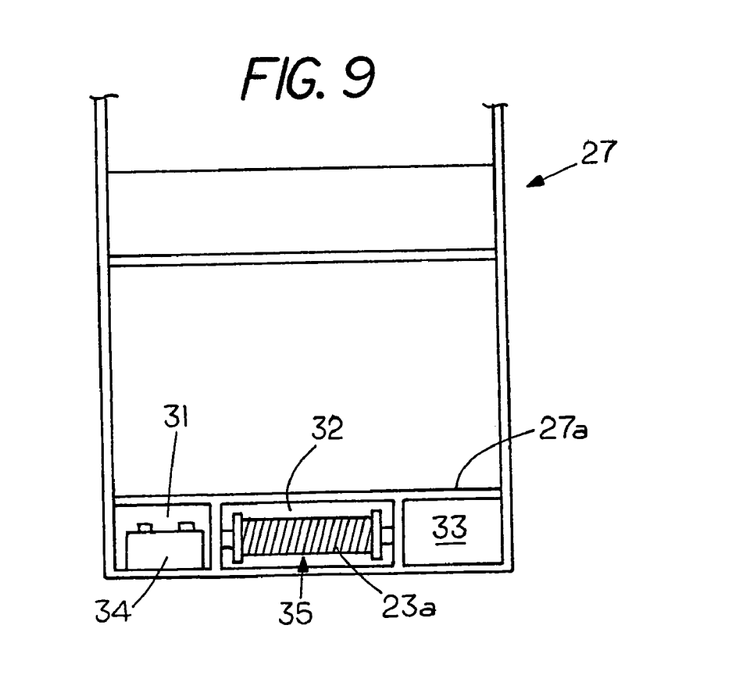
FIG. 9 shows a front view of the frame box, which is fitted to extend around the circumference of a window housing located on a building.

FIG. 9 shows a front view of the frame box 27, which is fitted to extend around the circumference of a window housing 30 located on a building 18. The frame box 27 preferable is structurally stronger than the construction debris chute 11. Preferably, the exterior dimension of the common panels 14 is the same as an interior dimension of the box 27. In the embodiment of FIG. 9, the frame box 27 includes a first housing 31, a second housing 32, and a third housing 33 all extending from a bottom surface 27a of the frame box 27. The first housing 31 function for supporting a power source such as a battery 34 therein, the second housing 32 function for supporting a winch such as a remote controlled electric winch 35 therein and the third housing 33 providing for storage space therein.

In the process of installing the window receiver box 12 to the building 18, a window 36 shown in phantom, is first removed from the window housing 30. The frame box 27 portion of the window receiver box 12 is then fixedly secured to the window housing 30 with the chute-receiving portion 28 of the window receiver box 12 extending outwardly from the building 18. Referring to FIGS. 1 and 8, a first end 11a of the construction debris chute 11 is then secured within the interior surface of the chute-receiving portion 28 of the window receiver box 12.

Figure 10:
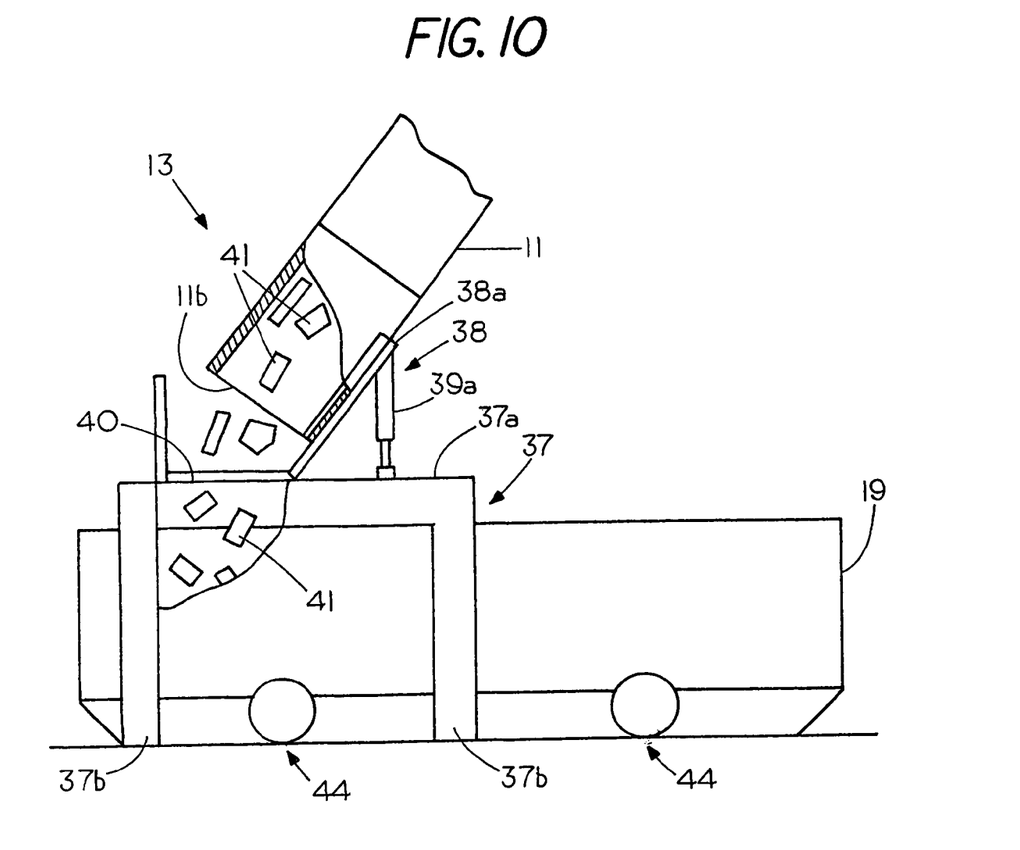
FIG. 10 shows close-up partial cross-sectional view of the bottom discharge unit of the construction debris chute system of FIG. 1.

FIG. 10 shows close-up partial cross-sectional view of the bottom discharge unit of the construction debris chute system 10 of FIG. 1. The bottom discharge unit 13 as shown in FIGS. 1 and 10 generally comprises two main parts, namely a discharge platform frame 37 and a chute-supporting base 38.

Figure 11:
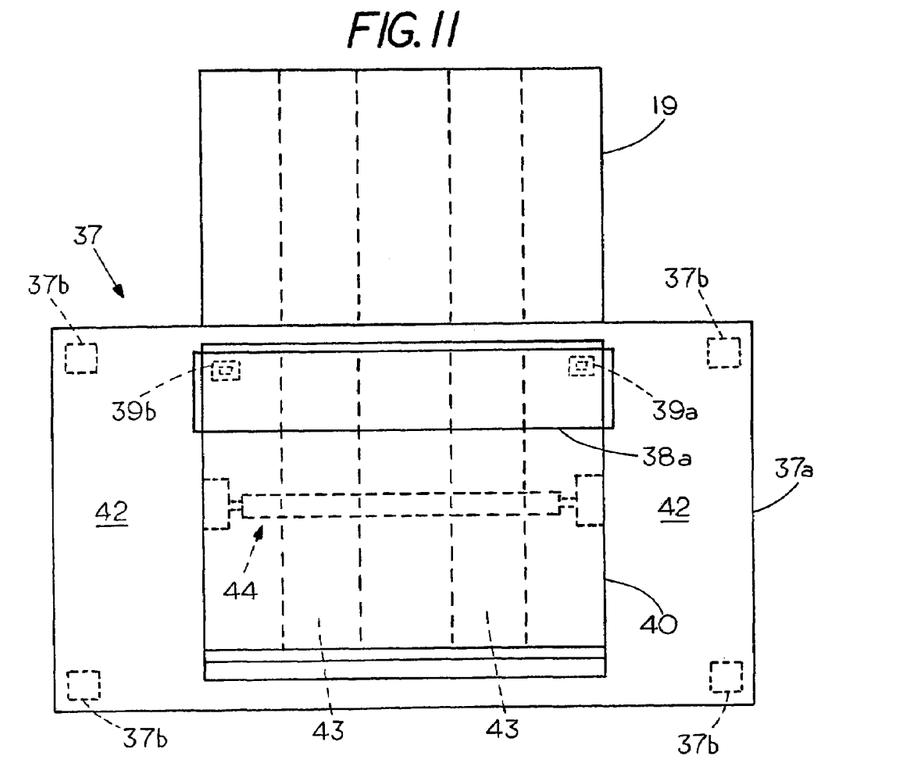
FIG. 11 shows a top view of the discharge platform frame of the bottom discharge unit of FIGS. 1 and 10.

FIG. 11 shows a top view of the discharge platform frame 37 of the bottom discharge unit 13 of FIGS. 1 and 10, which is fitted to extend over a portion of dumpster 19. In the embodiment shown in FIGS. 10 and 11, the discharge platform frame 37 comprises a platform 37a supported over a portion of the dumpster 19 by a set of columns 37b. The platform 37a includes a construction debris outlet 40 for directing construction debris 41 moving through the construction debris chute 11 into the dumpster 19. Located proximal the circumference of the construction debris outlet 40 are walk surfaces 42 for supporting the user thereon. In regards to the dumpster 19, the dumpster 19 can include the use of dumpster guides 43 and rollers 44 as shown in FIGS. 10 and 11 to ease the movement of the dumpster 19 especially when the dumpster 19 is heavy from being near full.

The chute-supporting base 38 comprises a pair of adjustable legs 39a and 39b supporting a chute-supporting surface 38a at an angle $\theta$, where $\theta<90°$, from the platform 37a of the discharge platform frame 37. Chute-supporting surface 38a function for receiving a second end 11b of the construction debris chute 11 thereon. Similar to the frame box 27 of FIGS. 8 and 9 the chute-supporting base 38 preferable is structurally stronger than the construction debris chute 11.

Figure 12:
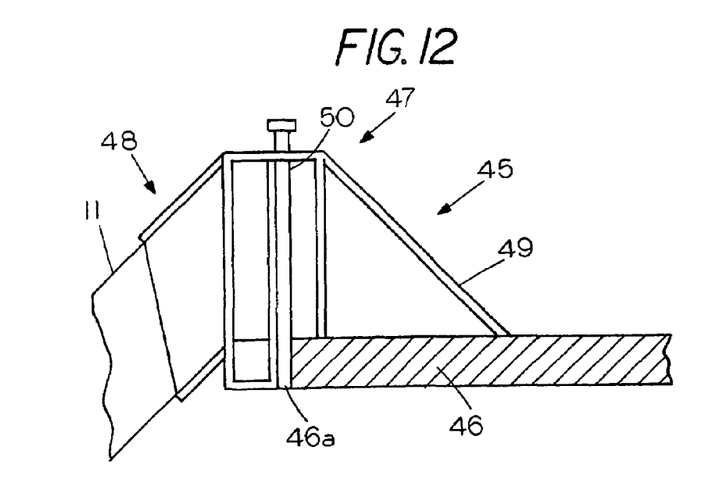
FIG. 12 shows close-up partial cross-sectional view of a deck receiver box for use with the construction debris chute system of FIG. 1 for securement to building decks.

FIG. 12 shows close-up partial cross-sectional view of a deck receiver box 45 for use with the construction debris chute system 10 of the present invention for securement to building decks 46. Similar to the window receiver box 12 of FIG. 3, the deck receiver box 45 of FIG. 12 comprises two main parts, namely a frame box 47 and a chute-receiving portion 48 extending at an angle from the frame box 47. The frame box 47 is secured to a portion of an edge 46a of the deck 46 located on a building and includes the use of an angled support bar 49 to provide further overall stability to the deck receiver box 45. The deck receiver box 45 is also shown in FIG. 12 including a handrail 50 to help provide balance to the user.

Figure 13:
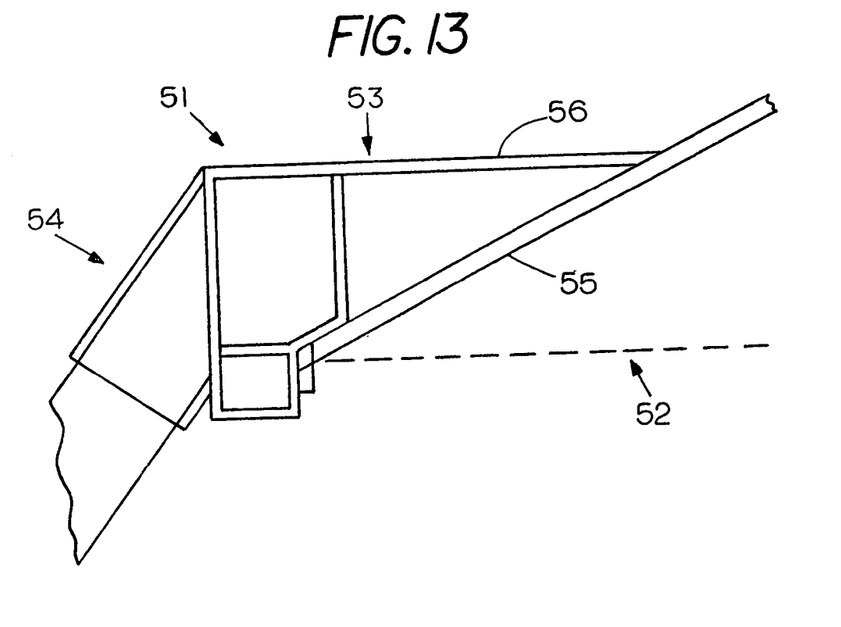
FIG. 13 is close-up partial cross-sectional view of a pitched roof receiver box for use with the construction debris chute system of FIG. 1 for securement to building having a pitched roof.

FIG. 13 is close-up partial cross-sectional view of a pitched roof receiver box 51 for use with the construction debris chute system 10 of the present invention for securement to building having a pitched roof 52. Similar to the window receiver box 12 of FIG. 1, the pitched roof receiver box 51 of FIG. 13 also comprises two main parts, namely a frame box 53 and a chute-receiving portion 53 extending at an angle from the frame box 53. The frame box 53 is secured to a portion of the pitched roof 53 via a truss roofline 55 and includes the use of a horizontal support bar 56 linking the frame box 53 to a further portion of the pitched roof 52 to provide further overall stability to the pitched roof receiver box 51.

Figure 14:
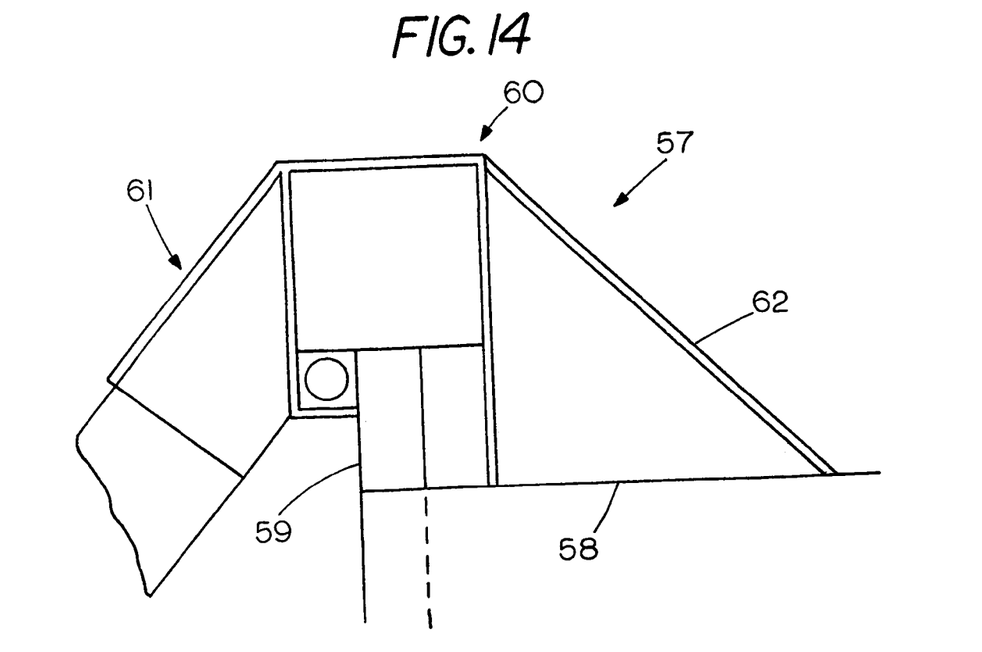
FIG. 14 is close-up partial cross-sectional view of a flat roof receiver box for use with the construction debris chute system of FIG. 1 for securement to buildings having a flat roof with raised or projected walls.

FIG. 14 is close-up partial cross-sectional view of a flat roof receiver box 57 for use with the construction debris chute system 10 of the present invention for securement to buildings having a flat roof 58 with raised or projected walls 59. Similar to the window receiver box 12 of FIG. 1, the flat roof receiver box 57 of FIG. 14 also comprises two main parts, namely a frame box 60 and a chute-receiving portion 61 extending at an angle from the frame box 60. The frame box 60 is shown in FIG. 14 supported and/or secured to a portion of the raised or projected wall 59 of the flat roof 58. The frame box 60 of the flat roof receiver box 57 is further secured to a portion of the flat roof 58 and similar to the deck receiver box of FIG. 12 includes the use of an angled support bar 62 to provide further overall stability to the flat roof receiver box 57.

I claim:

1. A construction debris chute system comprising:
   a construction debris chute formed by a plurality of common panels, said plurality of common panels each comprising a first panel, a second panel and a bottom panel that are linked to each other by a set of hinges;
   a construction debris receiver box comprising a frame box and a chute-receiving portion extending at an angle from the frame box, said chute-receiving portion for receiving a first end of said construction debris chute; and a bottom discharge unit comprising a discharge platform frame fitted to extend over a portion of a dumpster and a chute-supporting base extending upwards at an angle from the discharge platform frame for receiving a second end of the construction debris chute therein, said discharge platform frame having a platform supported by a set of column with said platform including a construction debris outlet thereon for directing construction debris moving through the construction debris chute into said dumpster.

2. The construction debris chute system of claim 1 wherein the sets of common panels of the construction debris chute are secured to each other by a plurality of bolts.

3. The construction debris chute system of claim 1 wherein the frame box comprises a window receiver box fitted to extend around the circumference of a window housing located on a building.

4. The construction debris chute system of claim 1 wherein the frame box comprises a deck receiver box secureable to a portion of a deck located on a building, said deck receiver box including an angled support bar to provide further stability to said construction debris receiver box.

5. The construction debris chute system of claim 1 wherein the frame box comprises a roof receiver box secureable to a portion of roof, said roof receiver box including a horizontal support bar linking the roof receiver box to a further portion of said roof to provide further stability to said construction debris receiver box.

6. The construction debris chute system of claim 1 wherein the frame box comprises a flat roof receiver box secureable to a portion of a flat roof located on a building, said deck receiver box including an angled support bar to provide further stability to said construction debris receiver box.

7. The construction debris chute system of claim 1 wherein said bottom panels each include a set of cable guide bracket each for supporting a guide cable therein.

8. The construction debris chute system of claim 7 wherein each of said cable guide bracket comprises a set of rotating bolt which cooperate to support a guide cable therebetween.

9. The construction debris chute system of claim 7 including a winch for actuating said plurality of common panels to erect said construction debris chute.

10. The construction debris chute system of claim 1 wherein the chute-supporting base comprises a pair of adjustable legs supporting said chute-supporting surface at an angle from the platform of the discharge platform frame.

11. The construction debris chute system of claim 10 wherein said pair of adjustable legs supports said chute-supporting surface at an angle between 45°-90° from the platform of the discharge platform frame.

12. A construction debris chute system comprising:
a construction debris chute formed by a plurality of common panels, said plurality of common panels each comprising a first panel, a second panel and a bottom panel that are linked to each other by a set of hinges;
a set of cable guide bracket located on said each of said bottom panels for supporting a guide cable therein;
a construction debris receiver box comprising a frame box and a chute-receiving portion extending at an angle from the frame box, said chute-receiving portion for receiving a first end of said construction debris chute; and
a bottom discharge unit comprising a discharge platform frame fitted to extend over a portion of a dumpster and a chute-supporting base extending upwards at an angle from the discharge platform frame for receiving a second end of the construction debris chute therein, said discharge platform frame having a platform supported by a set of column with said platform including a construction debris outlet thereon for directing construction debris moving through the construction debris chute into said dumpster.

13. The construction debris chute system of claim 12 wherein each of said cable guide bracket comprises a set of rotating bolt which cooperate to support a guide cable therebetween.

14. The construction debris chute system of claim 12 wherein the discharge platform frame includes a walk surface located proximal the circumference of the construction debris outlet for supporting the user thereon.

15. The construction debris chute system of claim 12 wherein the dumpster include a set of dumpster guides and rollers to ease the movement of the dumpster.

16. The construction debris chute system of claim 12 wherein the chute-supporting base comprises a pair of adjustable legs supporting said chute-supporting surface at an angle from the platform of the discharge platform frame.

17. The construction debris chute system of claim 16 wherein said pair of adjustable legs supports said chute-supporting surface at an angle of less than 90° from the platform of the discharge platform frame.

18. The construction debris chute system of claim 12 wherein the said chute-supporting base is structurally stronger than the construction debris chute.

19. A construction debris chute system comprising:
a construction debris chute formed by a plurality of common panels, said plurality of common panels each comprising a first panel, a second panel and a bottom panel that are linked to each other by a set of hinges;
a set of cable guide bracket located on said each of said bottom panels for supporting a guide cable therein;
a construction debris receiver box comprising a frame box and a chute-receiving portion extending at an angle from the frame box, said chute-receiving portion for receiving a first end of said construction debris chute;
a bottom discharge unit comprising a discharge platform frame fitted to extend over a portion of a dumpster and a chute-supporting base extending upwards at an angle from the discharge platform frame for receiving a second end of the construction debris chute therein, said discharge platform frame having a platform supported by a set of column with said platform including a construction debris outlet thereon for directing construction debris moving through the construction debris chute into said dumpster; and
a pair of adjustable legs supporting said chute-supporting surface at an angle of less than 90° from the platform of the discharge platform frame.

20. The construction debris chute system of claim 19 wherein each of said cable guide bracket comprises a set of rotating bolt which cooperate to support a guide cable therebetween.

* * * * *